Jan. 22, 1963  O. L. EARL  3,074,446
MACHINE FOR HARVESTING TREES
Filed Sept. 23, 1960  12 Sheets-Sheet 1

INVENTOR.
Oliver L. Earl
BY
Attys.

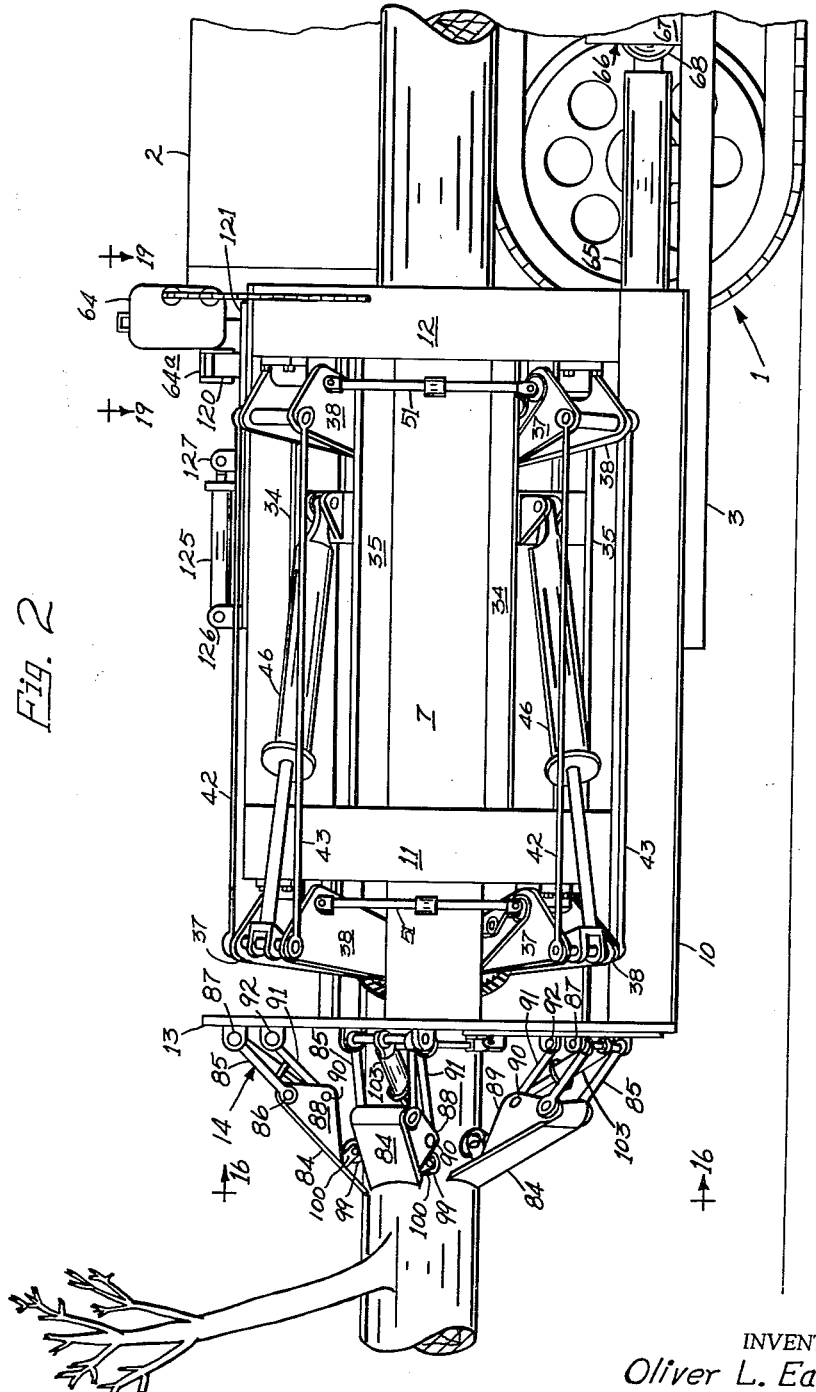

Jan. 22, 1963    O. L. EARL    3,074,446
MACHINE FOR HARVESTING TREES
Filed Sept. 23, 1960    12 Sheets-Sheet 3
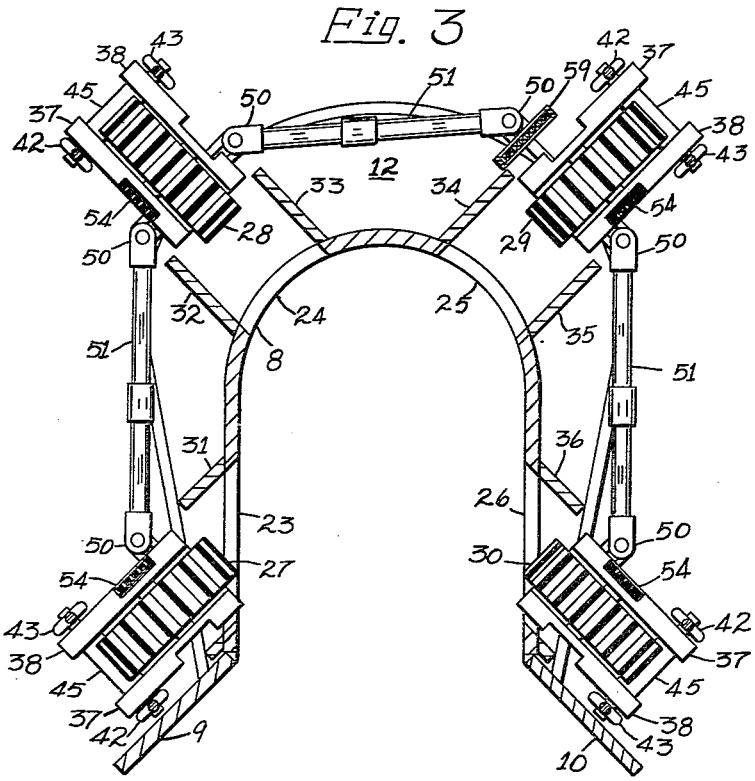
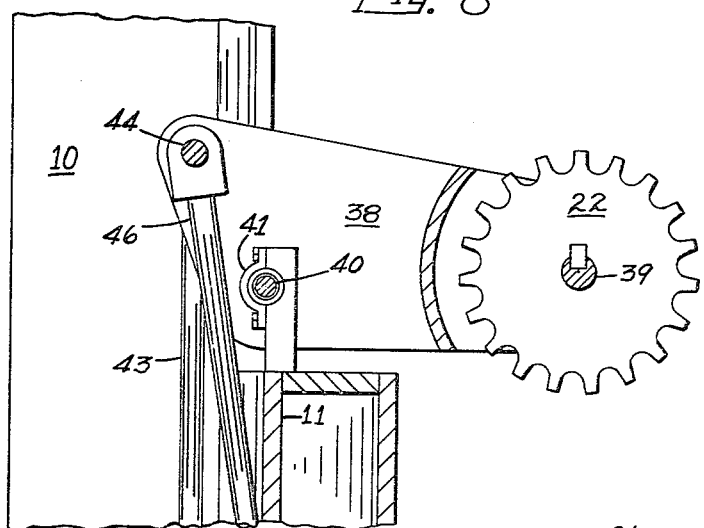
INVENTOR.
Oliver L. Earl
BY *Wells & St John*
Attys.

Jan. 22, 1963  O. L. EARL  3,074,446
MACHINE FOR HARVESTING TREES
Filed Sept. 23, 1960  12 Sheets-Sheet 4
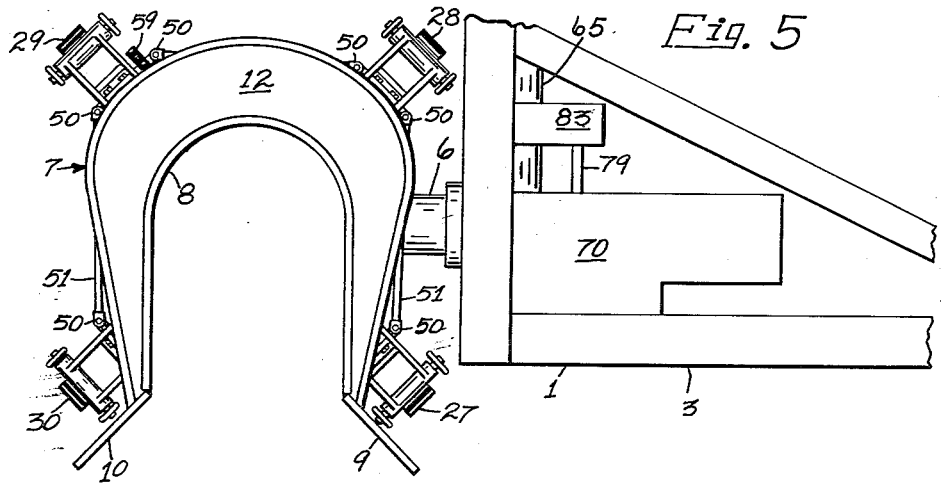
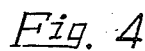
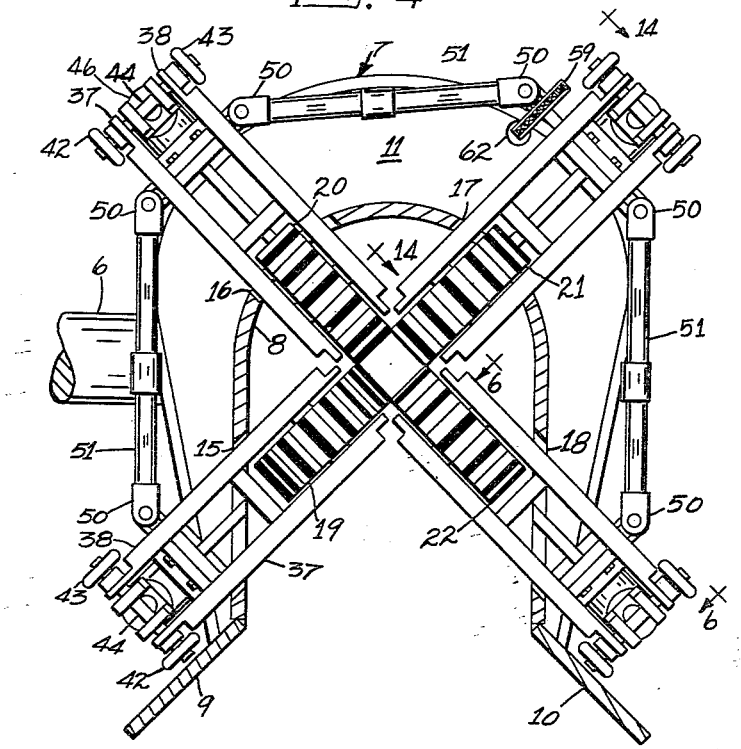
INVENTOR.
Oliver L. Earl
BY
Attys.

Jan. 22, 1963 O. L. EARL 3,074,446
MACHINE FOR HARVESTING TREES
Filed Sept. 23, 1960 12 Sheets-Sheet 5
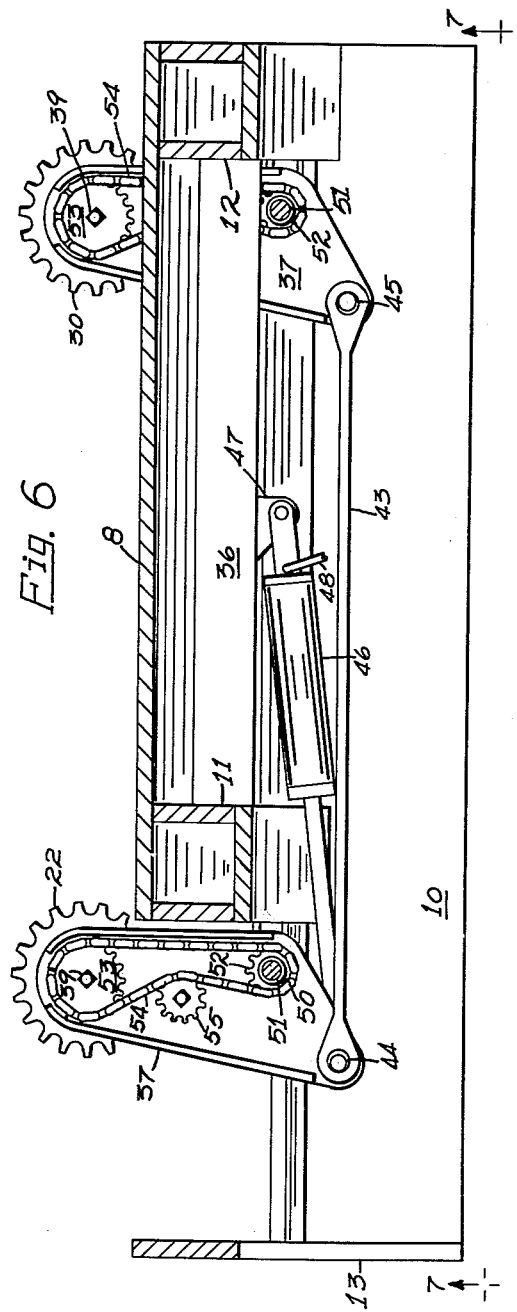
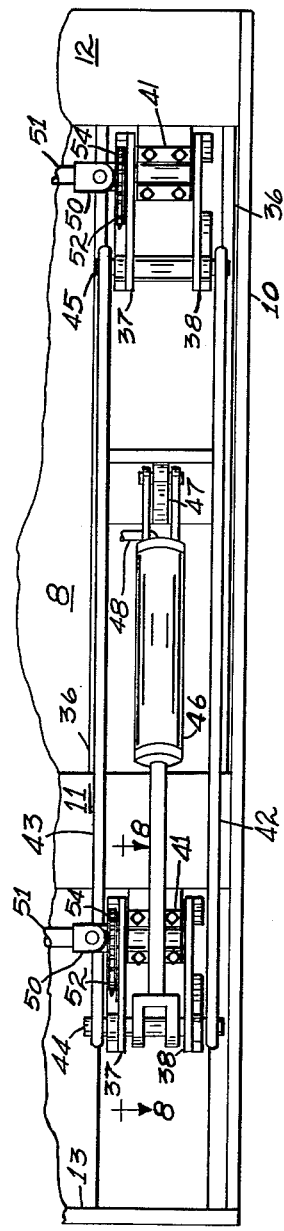
INVENTOR.
Oliver L. Earl
BY Wells & St John
Attys.

Jan. 22, 1963     O. L. EARL     3,074,446
MACHINE FOR HARVESTING TREES
Filed Sept. 23, 1960     12 Sheets-Sheet 6
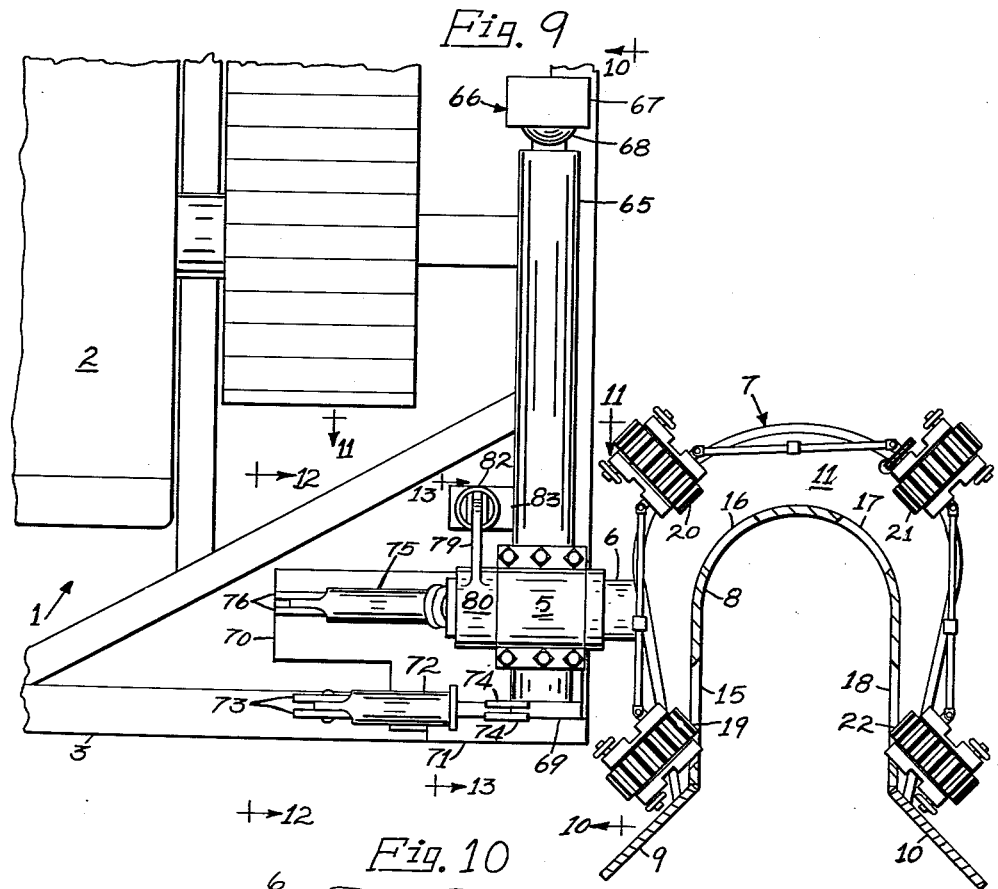
INVENTOR.
Oliver L. Earl
BY *Wells & St. John*
Attys.

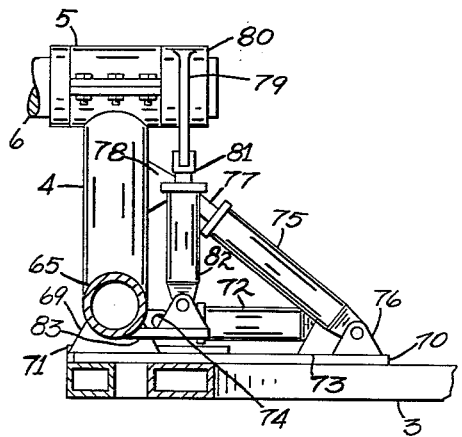
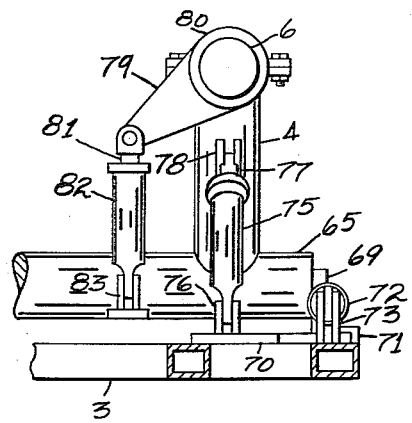
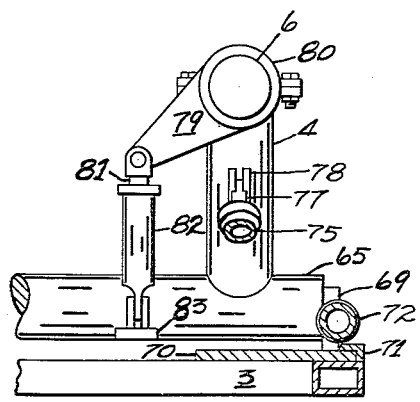

Jan. 22, 1963  O. L. EARL  3,074,446
MACHINE FOR HARVESTING TREES
Filed Sept. 23, 1960  12 Sheets-Sheet 8

INVENTOR.
Oliver L. Earl
BY Wells & H. John
Attys.

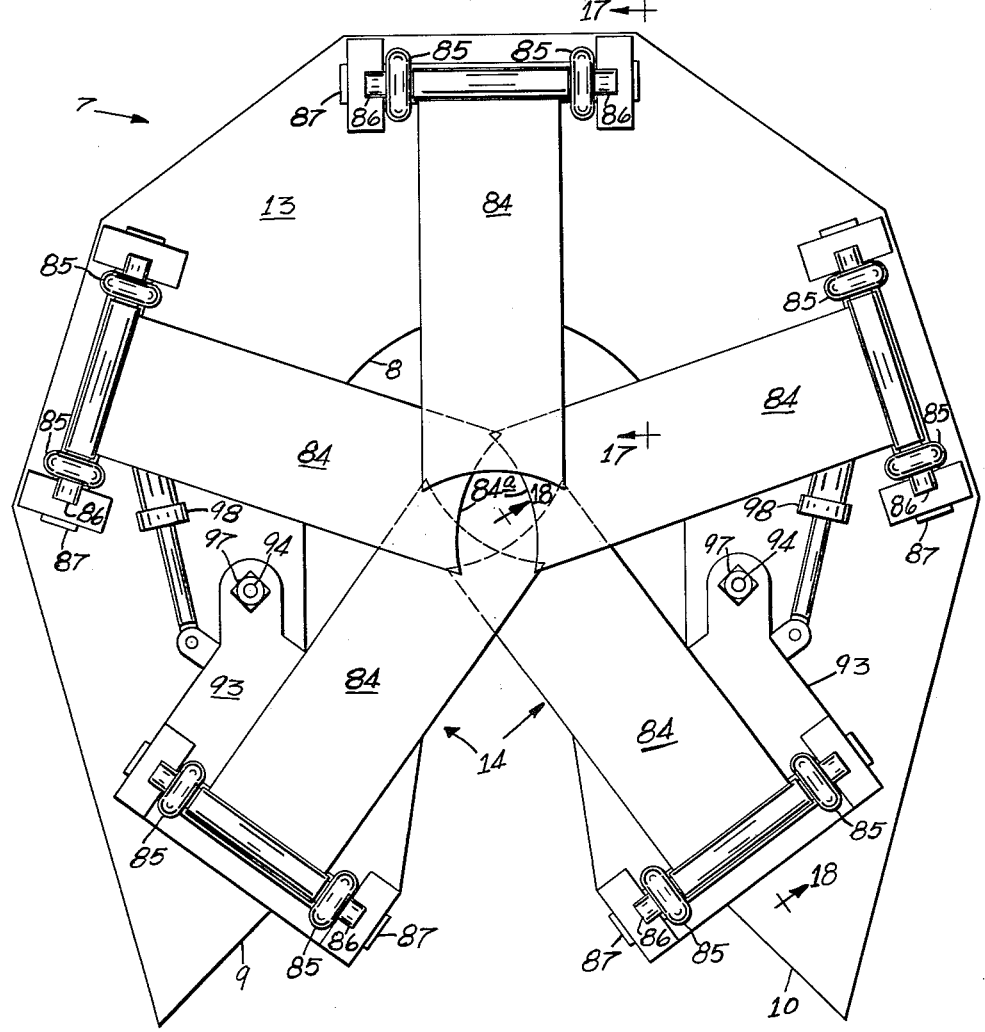

Jan. 22, 1963     O. L. EARL     3,074,446
MACHINE FOR HARVESTING TREES
Filed Sept. 23, 1960     12 Sheets-Sheet 10
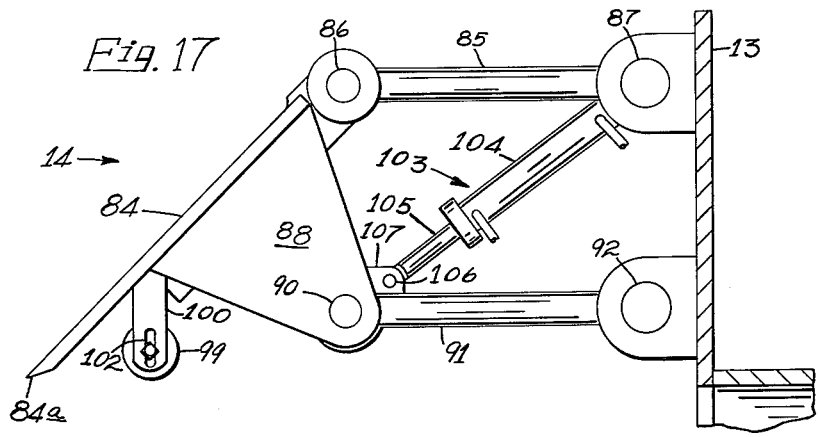
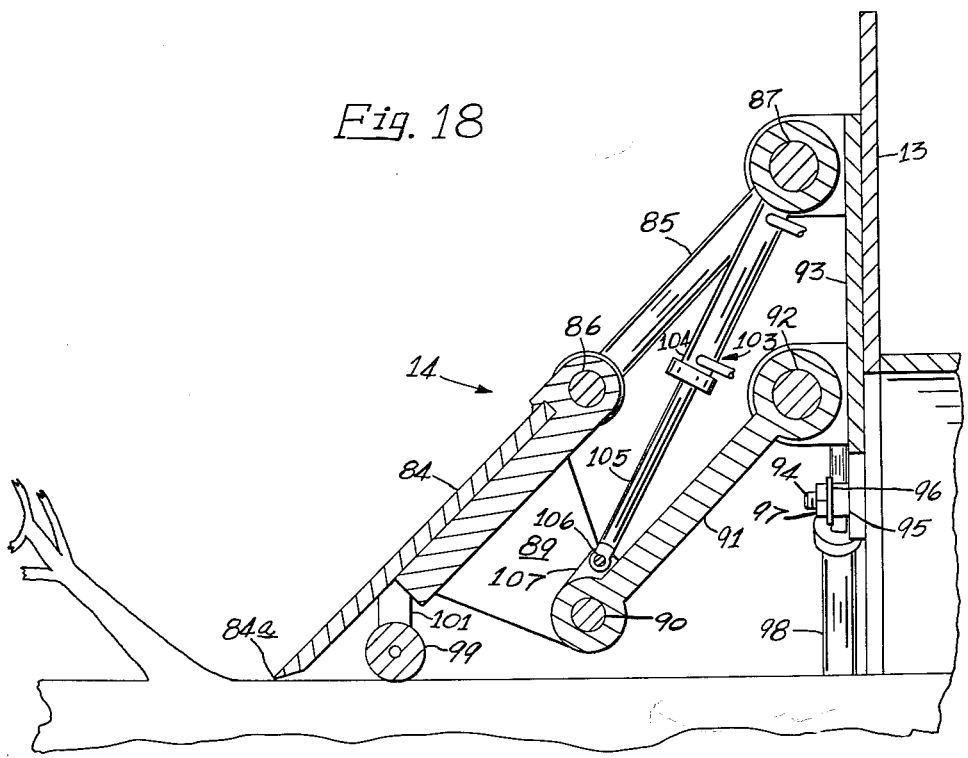
INVENTOR.
Oliver L. Earl
BY Wells & St John
Attys.

Jan. 22, 1963  O. L. EARL  3,074,446
MACHINE FOR HARVESTING TREES
Filed Sept. 23, 1960  12 Sheets-Sheet 11

INVENTOR.
Oliver L. Earl
BY Wells & St John
Attys.

Jan. 22, 1963 O. L. EARL 3,074,446
MACHINE FOR HARVESTING TREES
Filed Sept. 23, 1960 12 Sheets-Sheet 12
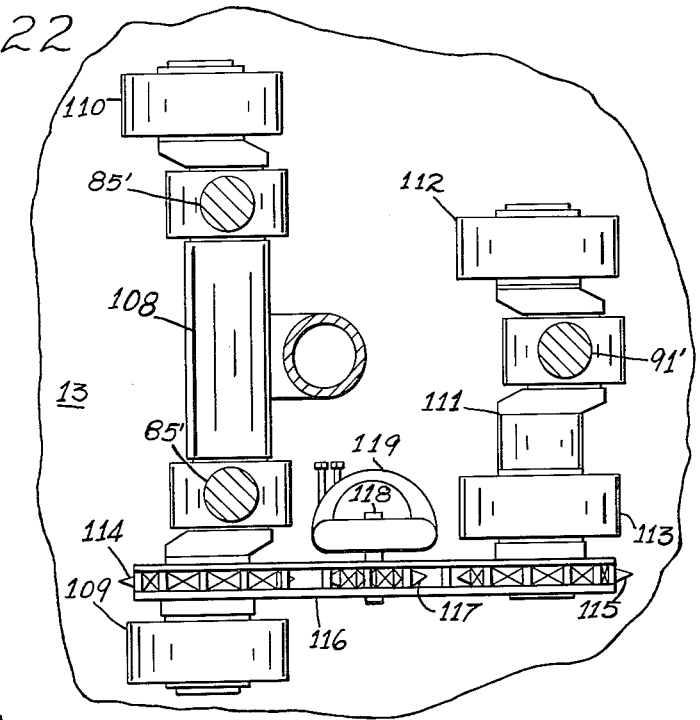
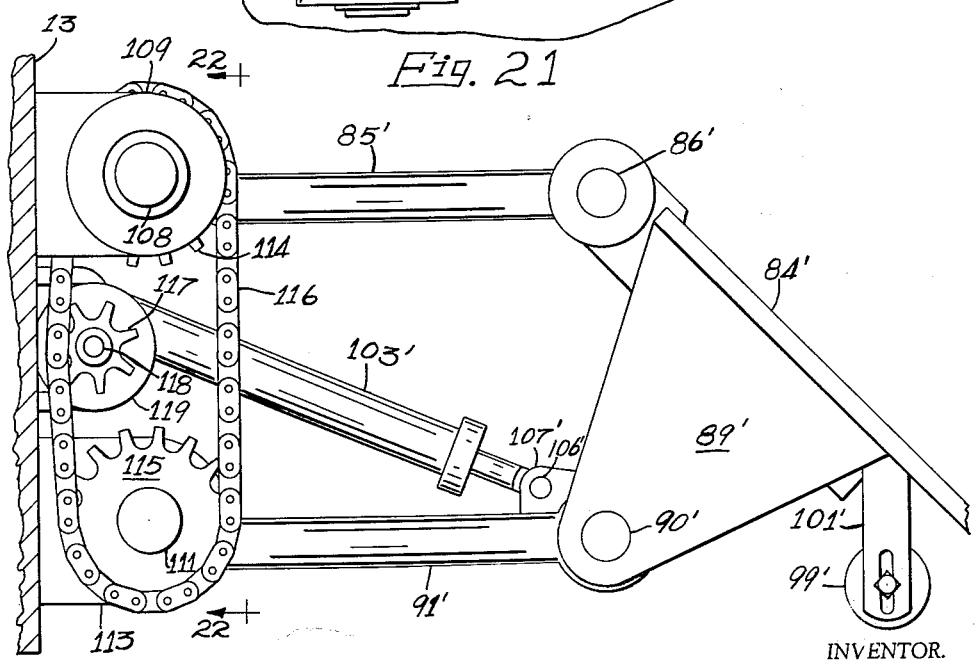
INVENTOR.
Oliver L. Earl
BY
Attys.

United States Patent Office 3,074,446
Patented Jan. 22, 1963

3,074,446
MACHINE FOR HARVESTING TREES
Oliver L. Earl, Asotin, Wash.
Filed Sept. 23, 1960, Ser. No. 57,928
6 Claims. (Cl. 144—3)

This invention relates to a machine for harvesting trees. There are certain types of trees which grow in relatively thick stands and usually are fairly uniform in size. One example of such trees is the lodgepole pine. These trees are often found in large stands where the size of the trees at the base will be of the order of 10 to 16 inches in diameter and all the trees in a particular group will be very close to the same diameter. It is the purpose of the present invention to provide a machine having all the necessary equipment for grasping such a tree as has been described so that it can be held against tipping while it is being cut off and then lowered to horizontal position under control of the operator. The machine is provided with suitable mechanisms to adjust for leaning trees and carries the means to limb the tree when it is laid down to horizontal position.

It is a more specific object of this invention to provide in a tree harvesting machine which can be mounted on a vehicle such as a crawler tractor, a tree holding mechanism embodying a major jaw which can be placed around a standing tree and groups of grippers moutned on the jaw in vertically spaced relation with means to move the grippers toward and away from a tree within the jaw to clamp against the tree for sustaining it when the tree is cut off below the jaw, together with means for moving the jaw and the gripped tree between an upright and horizontal position while it is so gripped.

A further and more specific purpose of the invention is to provide a machine of the character above described with a tree limbing device and means including said grippers for moving the tree lengthwise of the jaw past the limbing device while the grippers are still holding the tree.

Another specific object of the invention is to provide a novel tree handling mechanism embodying a jaw to fit around a tree and combined gripping and feeding members on the jaw movable into and out of engagement with a tree within the jaw, together with mounting means for said jaw operable to tilt the jaw with respect to the vertical in two directions at right angles to each other whereby to align the jaw with trees more or less inclined to the vertical.

It is a further object of the invention to provide a tree harvesting machine of the character referred to hereinbefore in which a tree receiving jaw has means thereon to grip and hold a tree and is mounted to swing between a vertical and a horizontal position, said jaw having thereon a tree limbing device operable to cut the limbs from the tree by moving the tree lengthwise through the jaw.

It is also a purpose of the invention to provide a machine of the character referred to in the preceding paragraph with a cut off means operable to cut the tree as it is limbed into desired lengths.

The nature and advantages of my invention will appear more fully from the following description and the accompanying drawings wherein a preferred form of the invention is shown. The drawings and description are intended to be illustrative only, however, and not to limit the invention except insofar as it is limited by the claims. Various modifications and details of the construction may obviously be made without departing from the scope of the invention as defined by the claims.

In the drawings:

FIGURE 2 is a side view of the machine complete with the tree limber and cut off, showing how it handles a tree which is laid down to horizontal position;

FIGURE 3 is an enlarged plan sectional view taken substantially on the line 3—3 of FIGURE 1 and showing the lower group of grippers in place;

FIGURE 4 is an enlarged sectional view taken on the line 4—4 of FIGURE 1, showing the grippers in closed position to illustrate the smallest size of tree;

FIGURE 5 is a fragmentary bottom view looking up at the tree receiving jaw, its grippers and the adjacent frame that supports the jaw;

FIGURE 6 is a sectional view taken on the line 6—6 of FIGURE 4;

FIGURE 7 is a view looking at FIGURE 6 from the line 7—7;

FIGURE 8 (sheet 3) is an enlarged fragmentary sectional view taken on the line 8—8 of FIGURE 7;

FIGURE 9 (sheet 6) is a plan view of the tree harvesting machine with the harvesting jaw being cut away substantially on the line 4—4 of FIGURE 1;

FIGURE 10 is a fragmentary sectional view taken on the line 10—10 of FIGURE 9;

FIGURE 11 is a fragmentary sectional view taken on the line 11—11 of FIGURE 9;

FIGURE 12 is a fragmentary sectional view taken on the line 12—12 of FIGURE 9;

FIGURE 13 is a fragmentary sectional view taken on the line 13—13 of FIGURE 9;

FIGURE 16 is an enlarged end view looking at FIGURE 2 from the left but showing the maximum closure of the limbing knives and leaving out all details of the mounting of the device to a vehicle;

FIGURE 17 is a fragmentary sectional view taken substantially on the line 17—17 of FIGURE 16 and illustrating one limbing knife with its mounting;

FIGURE 18 is a fragmentary sectional view taken substantially on the line 18—18 of FIGURE 16, showing the limbing knife and a portion of a felled tree to illustrate the approach of the limbing knife to a limb on the tree;

FIGURE 21 is a view similar to FIGURE 17 illustrating a modified form of the limbing device; and FIGURE 22 is a sectional view taken on the line 22—22 of FIGURE 21.

Figure 1:
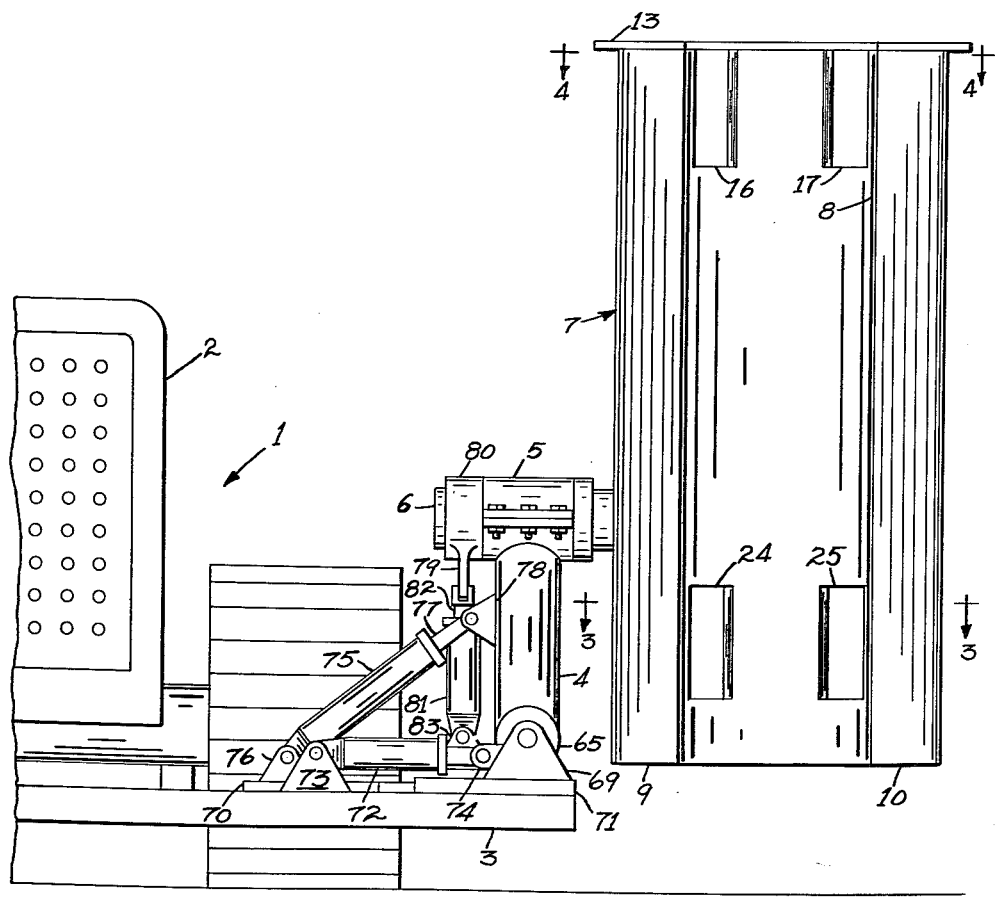
FIGURE 1 is a front view of the tree harvester showing a portion of a crawler type vehicle with the harvester mounted thereon.
Figure 14:
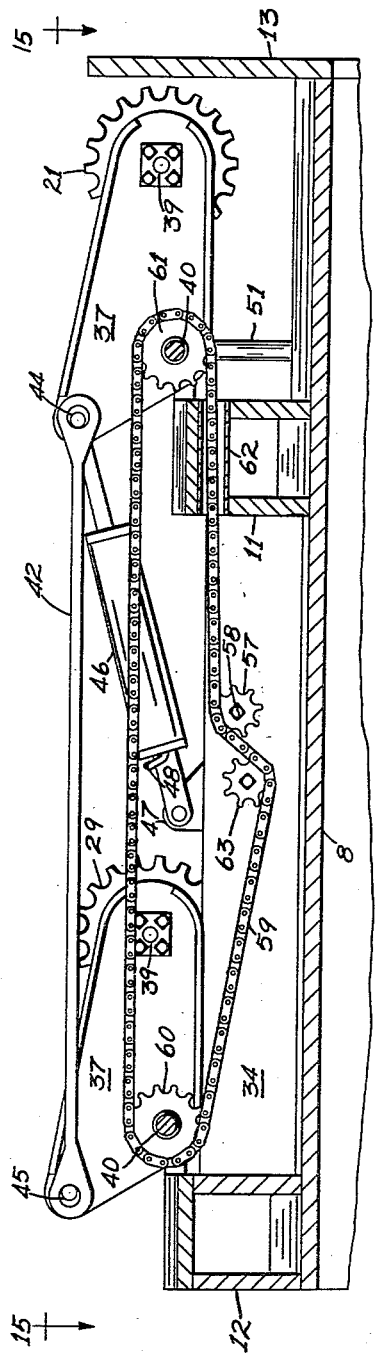
FIGURE 14 is a sectional view taken on the line 14—14 of FIGURE 4, but with the grippers in a changed position.
Figure 15:
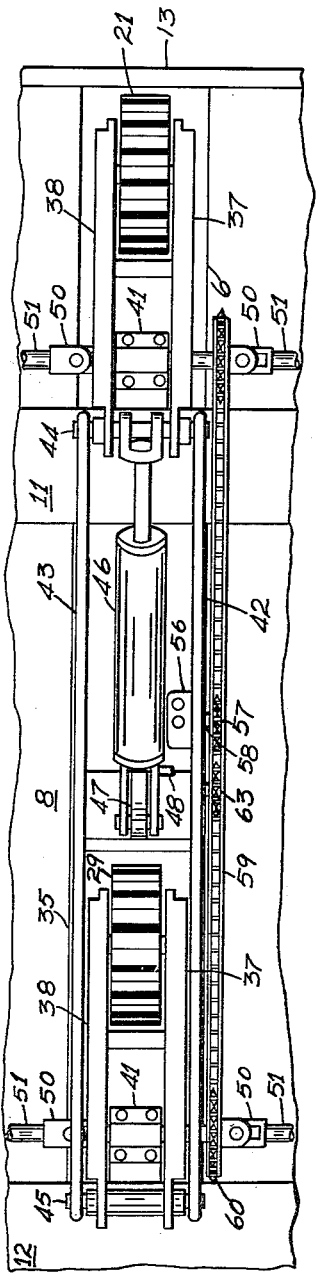
FIGURE 15 is a fragmentary plan view looking down on FIGURE 14.

Referring now in detail to the drawings, my invention provides a tree harvesting machine which is adapted to be mounted on a suitable vehicle such as a crawler tractor 1, having its power unit 2 and having a suitable frame 3 such as is commonly found on bulldozers. According to my invention I mount on the frame 3 of the bulldozer a pedestal 4 which has a bearing 5 at the top thereof which mounts a stub shaft 6. The stub shaft 6 is the support for a tree receiving jaw 7. The shaft 6 is controlled in its rotation in the bearing 5 and the pedestal 4 is mounted for pivotal movement of the frame 3 of the crawler tractor but in a manner which will be described later herein after the jaw and its associated mechanisms have been described.

The basic function of the jaw 7 and the parts carried thereby is to receive a tree while standing, grip the tree so as to prevent its movement with respect to the jaw while the tree is cut off and lowered to horizontal position and to move the tree in horizontal position through the jaw horizontally while it is being limbed and cut into logs.

The jaw 7 comprises a substantially U-shaped channel 8 having flared wings 9 and 10 and the channel is reenforced by two U-shaped hollow beam sections 11 and 12. At the top of the jaw 7 a plate 13 is provided for mounting a plurality of limbing devices 14. The jaw 7 is provided with upper apertures 15, 16, 17 and 18 adapted to permit the entry of gripper wheels 19, 20, 21 and 22 through the channel 8 below the upper plate 13 (see FIGURES 4 and 9). The channel 8 also has a plurality of apertures 23, 24, 25 and 26 just above the lower U-shaped reenforcement 12 adapted to pass lower grippers 27, 28, 29 and 30. Between the reenforcing members 11 and 12 the channel 8 is strengthened by ribs 31, 32, 33, 34, 35 and 36, all of which extend from the member 11 to the member 12.

The roller grippers 19—22, shown in FIGURES 4 and 9, constitute an upper group of gripping devices for gripping a tree trunk. The roller grippers 27—30 constitute a lower group of gripping devices to grip the tree trunk. Each group of grippers is so mounted as to swing through the corresponding openings in the channel 8 to engage the trunk of a tree within the jaw 7. The roller grippers of the two groups are also powered for rotation so that they may be used while gripping a tree trunk to move the tree trunk lengthwise of the jaw 7. The mounting of the roller grippers is essentially the same for all 8 of them. Referring now to FIGURES 6, 7, 14 and 15 for example, each roller gripper is mounted between two arms 37 and 38 by a shaft 39. The arms 37 and 38 are pivoted to the channel 8 by a shaft 40 and abearing 41 so that they may swing between the position shown in FIGURES 4 and 6 which is the extreme inward position and the position shown in FIGURES 3 and 14 which is the extreme outward position. To swing the gripper jaws the arms 37 and 38 of each one of the lower gripping devices is connected to the arms 37 and 38 of the corresponding one of the upper gripping devices by a pair of links 42 and 43 and connecting pins 44 and 45. A jack 46 is pivoted on an ear 47 on the jaw 7 and is connected to the pin 44 for swinging the arms 37 and 38. Fluid under pressure is supplied to the jack 46 through a conduit 48. By extending the jack 46 the gripping devices are swung inward and they will of course, swing out when pressure is released within the jack 46.

The roller grippers of both groups of gripping devices must be powered for rotation both for the purpose of preventing their rotation when they are gripping a tree and merely holding it and for moving the tree while it is gripped after the tree is laid down into horizontal position. This powering is accomplished by utilizing the shafts 40 as drive shafts and coupling them together in each group by means of a plurality of universal joints 50 and interconnecting shafts 51. These connections are illustrated for the lower group of gripping devices in FIGURE 3 and for the upper group of gripping devices in FIGURE 4. To connect each roller gripper to its shaft 40 a sprocket wheel 52 is affixed to each shaft 40 and a sprocket wheel 53 is affixed to each shaft 39 of the roller grippers. Roller chain 54 connects the sprocket wheels 52 and 53 and passes beneath an idler sprocket 55 which is pivoted on the arm 37. One of the shafts 40 is powered in each group from an hydraulic motor 56 (see FIGURE 15) which is mounted on the channel 8 and which has a sprocket wheel 57 on its shaft 58. Roller chain 59 couples the sprocket wheel 57 to a sprocket wheel 60 which is mounted on the shaft 40 that pivots the arms 37 and 38 for the roller gripper 29. Another sprocket wheel 61 is mounted on the shaft 40 that pivots the arms 37 and 38 for the roller gripper 21. The chain 59 goes through an aperture 62 provided in the reenforcing member 11. The roller chain 59 is also trained around an idler sprocket 63 which is mounted on the reenforcing rib 34.

The construction just described provides a means whereby power can be applied to the various roller grippers 19—22 and 27—30 so as to rotate the roller grippers or hold them against rotation by means of the motor 56. It is obvious that this is only one method of applying power to the roller grippers. Individual modification of each group of roller grippers could also be accomplished by using two hydraulic motors 56. The operation of the roller grippers to seize and hold a tree is quite simple. When the jaw 7 is moved against a tree the arms 37 and 38 are caused to move inward by means of the jacks 46 from the positions shown in FIGURE 3 until the roller gripers strike thet ree. Normally the lower group of rollers will engage the tree first because of the slight decrease in diameter upward of the tree and the jacks 46 will force the roller grippers in the lower group to bite into the tree. Usually the amount of decrease in diameter of the tree is so slight that both the lower and upper groups of grippers will make firm engagement with the tree. It is evident from FIGURES 3 and 4 that the size of the tree to be gripped may be greatly varied from the maximum size receivable within the jaw 7 down to the minimum size when the lever arms 37 and 38 are moved inwardly so far that the shafts 39 and 40 stand in a plane at right angles to the axis of the jaw 7. With this construction the tree is supported at four points by each group of roller grippers. So long as the roller grippers are held against rotation the tree can be held stationary. When the tree is first gripped the roller grippers are held stationary while the tree is cut off. A chain saw 64 (FIGS. 2, 19 and 20) is mounted on the jaw 7 in a manner which will later be described so that it may be swung inward against a tree below the lower end of the jaw 7. As the tree is cut off power can be applied to the roller grippers so as to lift the tree clear of stump before laying it down.

Referring now to FIGURES 1 and 9–13 inclusive, the mechanism for manipulating the jaw 7 will be described. As stated hereinbefore the jaw 7 is carried by a stub shaft 6 which is rotatable in a bearing 5 at the top of the pedestal 4. The pedestal 4 is affixed to a horizontal tube 65 which has one end mounted on the frame 3 of the vehicle by a ball and socket joint indicated at 66 and consisting of a block 67 on the frame 3 and a socket and a ball 68 on the tube 65 seated in the socket. The other end of the tube 65 is rotatably mounted on a bracket 69 which projects upwardly from a plate 70 that is slidably mounted on the frame 3. Guides for the plate 70 are indicated at 71 (see FIGURES 10 and 12). The plate 70 can be made to slide on the frame 3 so as to move the jaw 7 and its supporting shaft 5 and pedestal 4 toward and away from the frame 3. This movement is accomplished by means of a jack 72 which has one end pivoted in upstanding ears 73 on the frame 3 and the other end pivotally secured to the bracket 69 which has ears 74 thereon for this purpose. Sufficient play is provided in the pivotal connection to the ears 74 to accommodate for the slight angular displacement that takes place when the tube 5 is moved about the ball and socket joint 66 by the jack 72.

In order to tilt the pedestal 4 to move the jaw 7 out of vertical transversely with respect to the vehicle the supporting plate 70 has a jack 75 pivoted thereto on ears 76 and the piston rod 77 of the jack 75 is pivoted to ears 78 that are provided on the pedestal 4.

To swing the jaw 7 from vertical to horizontal position in a direction toward the open side of the jaw the shaft 6 has a lever arm 79 fixed thereto by a collar 80. This lever arm 79 has its free end pivoted to piston rod 81 of a jack 82. The jack 82 is pivoted on a bracket 83 that is affixed to the tube 65. By means of the jack 82 the lever arm 79 can be turned through an arc of more than 90 degrees to move the jaw 7 from upright to horizontal position.

Referring now to FIGURES 16 and 18 inclusive and FIGURE 2, these figures illustrate the limbing mechanism by which limbs are cut off the tree. The limbing devices 14 are essentially alike. There are five of these devices arranged on the plate 13 and spaced apart so that they substantially cover the circumference of the tree with end blades 84. Except for the minor details of lengthening the supporting mechanisms for the blades 84 so as to stagger their position lengthwise of a tree in order that they may be swung inwardly to overlap as illustrated in FIGURE 16, the several units 14 are essentially alike. The construction is best illustrated in FIGURES 2, 17 and 18. Each unit 14 comprises a blade 84, two outer links 85 pivoted to the rear end of the blade 84 by pivots 86 and pivoted to the plate 13 by a pivot pin 87. Each blade has two flanges 88 and 89 on the inner side thereof. These flanges furnish support for a pivot pin 90 that pivots a third link 91 which is pivoted to the plate 13 by a pivot pin 92. The two lower limbing devices in FIGURE 16 have to be swung out of the way when a tree is being placed within the jaw 7 so their mounting to the plate 13 is by means of a pivoted plate 93 which carries the pivot pins 87 and 92. The plate 93 bears against the plate 13 and is pivoted thereto by a stud 94 fixed to the plate 13 and a bearing 95 fixed to the plate 93 (FIGURE 18). A washer 96 and a nut 97 retain the bearing 95 on the stud 94. For swinging the plates 93 about their pivots I provide jacks 98 which are connected between the plates 93 and 13 and are under the control of the operator so that he may swing the plates 93 out to clear the throat of the jaw 7 whenever the jaw is to be placed around a tree.

Each of the blades 84 of the limbing devices has a gauge roller 99 beneath it. This roller 99 is mounted between bars 100 and 101 and the bars are slotted as indicated at 102 (FIGURE 17) so that the roller can be adjusted to determine the position of the front edge 84a of the blade 84 with respect to a tree trunk on which the roller 99 rests. The limbing devices are each moved in against the tree trunk and retracted by an air jack 103, the cylinder 104 of which is pivoted on the pin 87 between the two links 85 and the piston rod 105 of which is connected to the lower end of the link 91 by a pin 106 and a pair of ears 107. Examination of FIGURES 17 and 18 shows how the extension of the jack 103 will move the links 85 and 91 inward to swing the blade 84 against a tree trunk. When the limbing blades are not in use they are drawn back by the jack 103 and held out of the way of a tree going into the jaw 7. The points of the blades 84 are beveled as shown at 84a and are curved as illustrated in FIGURE 16 for proper engagement with the limbs of a tree. The actual removal of the limb is accomplished by using the roller grippers mounted on the jaw 7 to advance the tree trunk and bring the limbs against the blades 84.

In FIGURES 21 and 22 I have shown a modification of the limbing mechanism which is adapted to provide a vibrating action to the blade 84'. In the case of relatively large limbs it is desirable to have some vibratory or chopping action of the blade 84'. This is accomplished by mounting the outer links 85' to the plate 13 by an eccentric shaft 108 that is journalled in bearings 109 and 110 mounted on the plate 13. A similar eccentric shaft 111 is used to mount the link 91' in bearings 112 and 113 on the plate 13. Sprocket wheels 114 and 115 are provided on the shafts 108 and 111. These wheels are driven by a roller chain 116 which is driven by a sprocket wheel 117 on the shaft 118 of an hydraulic motor 119. With this mount it is necessary to mount the air jack 103' directly upon the plate 13 rather than upon the pivot pin for the links 85'. The mounting of the two swing blades to the plate 93 is, of course, correspondingly changed in the modification. With this construction the rotation of the shafts 108 and 111 will cause a forward and back oscillation of the blade 84'. The air jack 103' does, of course, continue to press the blade 84' toward the tree to keep the roller 99 in engagement with the tree trunk during the oscillation movement.

Figure 19:
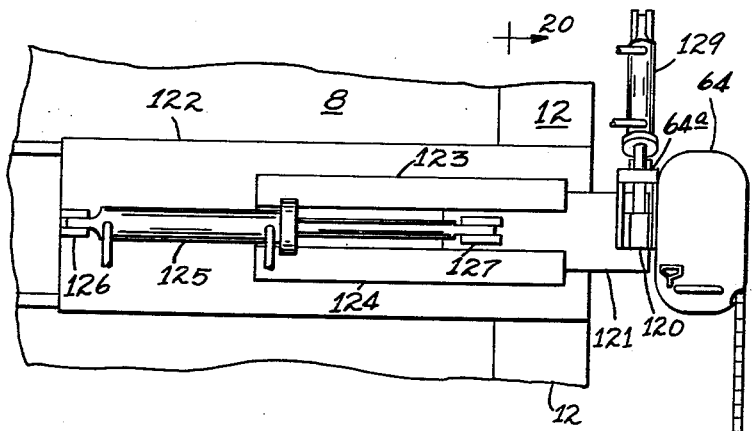
FIGURE 19 is a fragmentary plan view on an enlarged scale looking down at the saw mount on FIGURE 2.
Figure 20:
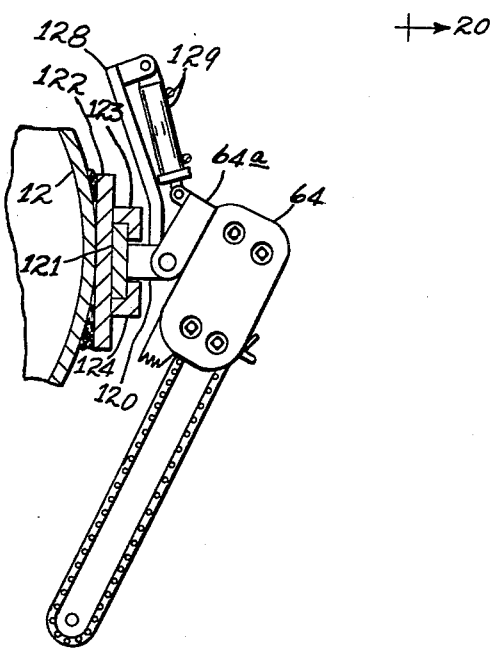
FIGURE 20 is a sectional view on the line 20—20 of FIGURE 19.

Referring now to FIGURES 19 and 20, these figures illustrate the mounting of the saw 64 so that it can be used to cut off the tree and to cut the limbed tree trunk into pieces. The saw 64 is pivotally mounted on a bracket 120 which is carried by a plate 121. The plate 121 is slidably mounted on the lower reenforcing member 12 by a backing plate 122 which has guides 123 and 124 thereon for the plate 121. An hydraulic jack 125 is connected between the bracket 126 on the plate 122 and a bracket 127 on the plate 121. In order to swing the saw 64 about its pivot on the bracket 120, I provide an arm 128 on the bracket 120 and connect a jack 129 between the outer end of the arm 128 and the base member 64a of the saw 64. The jack 125 is used to normally hold the saw 64 in the position shown in FIGURE 2 of the drawings where it is protected by the jaw 7 from engagement with any underbrush or projections below the jaw. When the saw is to be moved out to cutting position the jack 125 is extended as illustrated in FIGURE 19, so that the saw clears the end of the jaw 7 and can be swung across below the jaw 7 to engage a tree trunk held in the jaw 7.

It is believed to be clear from the foregoing description that I have provided a machine which will engage a standing tree within the jaw 7 with the two groups of grippers and thereafter hold the tree trunk while it is being cut off close to the ground level. The machine can lower the tree to horizontal position by rotation of the jaw 7 and can then limb the tree by rotation of the grippers holding the tree to bring the limbs against the blades 84 after these blades are brought into engagement with the tree trunk. This makes is possible to cut down, to limb and to cut up trees with the only manual labor necessary, aside from the operator of the machine, being the clearance of underbrush out of the way so that the jaw 7 can be engaged with the standing tree trunk. Any suitable means can be provided for collecting and taking away the logs which are cut from the tree trunk.

Having described my invention, I claim:
1. A tree harvesting machine, comprising:
   a supporting mobile framework;
   a rigid elongated jaw movably mounted on said framework for movement about a normally horizontal axis, said jaw being substantially U-shaped in cross section to provide a longitudinal normally vertical channel within which a tree trunk may be positioned;
   a plurality of gripping rollers located circumferentially about said channel and aligned with openings in said channel;
   movable mounting elements mounted on said jaw for motion toward or away from a tree trunk positioned therein, said rollers being rotatably carried about their central axes by said mounting elements for peripheral engagement with a tree trunk positioned within said jaw;
   first power means on said jaw operatively connected to said mounting elements adapted to selectively position said rollers through said openings outward of the channel or within the channel in engagement with a tree trunk;
   second power means connected to said rollers adapted to rotate said rollers in unison about their supporting axes on said mounting elements;
   and third power means on said framework operatively connected to said jaw adapted to move the jaw about said normally horizontal axis between a substantially upright longitudinal position and a substantially horizontal longitudinal position.

2. A tree harvesting machine comprising:
a vehicle frame;
movable frame means mounted on said vehicle frame for swinging adjustment in a horizontal direction;
an open rigid normally vertically extending jaw positioned alongside said vehicle frame and pivotally mounted on said movable frame means for rotation about a horizontal axis relative to said movable frame;
gripping means mounted on said jaw adapted to radially grip a tree trunk positioned therein, said gripping means being further adapted to effect longitudinal motion of a tree trunk engaged thereby;
power means operatively connected between said jaw and said movable frame means adapted to angularly position said jaw relative to said movable frame means;
means operatively connected between said vehicle frame and said movable frame means adapted to position said movable frame means relative to said vehicle frame through said swinging adjustment for alignment of said jaw with a standing tree;
and means mounted on said jaw adapted to sever a standing tree gripped in said jaw from its stump.

3. The invention as defined in claim 2 wherein said movable frame is pivoted on the vehicle frame about a vertical axis for said swinging adjustment.

4. A tree harvesting machine comprising:
a rigid vehicle frame;
movable frame means mounted on said vehicle frame for pivotal motion about a fixed vertical axis;
a rigid elongated jaw movably mounted on said frame means for pivotal motion about a normally horizontal axis on said frame means, said jaw being substantially U-shaped in cross section to provide a longitudinal normally vertical channel within which a tree trunk may be positioned;
a plurality of gripping rollers located circumferentially about said channel and aligned with openings in said channel;
movable mounting elements mounted on said jaw for motion toward or away from a tree trunk positioned therein, said rollers being rotatably carried about their central axes by said mounting elements for peripheral engagement with a tree trunk positioned within said jaw;
first power means on said jaw operatively connected to said mounting elements adapted to selectively position said rollers through said openings outward of the channel or within the channel in engagement with a tree trunk;
second power means connected to said rollers adapted to rotate said rollers in unison about their supporting axes on said mounting elements;
and a double acting hydraulic cylinder assembly pivotally connected between said movable frame means and a crank arm fixed relative to said jaw and protruding radially outward from the pivotal axis of said jaw on said movable frame means, said cylinder assembly being adapted to selectively move the jaw about said axis of said jaw on said movable frame means between a substantially upright longitudinal position and a substantially horizontal longitudinal position.

5. The invention as defined in claim 4 further comprising:
third power means mounted on said vehicle frame operatively connected to said movable frame means adapted to pivotally position said movable frame means about said fixed vertical axis.

6. A tree harvesting machine comprising:
a rigid vehicle frame;
movable frame means mounted on said vehicle frame including a pedestal assembly having one end pivotally connected to the vehicle frame by an axial spherical bearing, the remaining axial end of said pedestal assembly being pivotally carried for rotation about a horizontal axis on a supporting element mounted on said vehicle frame for movement in a horizontal direction;
a rigid elongated jaw movably mounted on said frame means for pivotal motion about an axis transverse to said horizontal axis, said jaw being substantially U-shaped in cross section to provide a longitudinal normally vertical channel within which a tree trunk may be positioned;
a plurality of gripping rollers located circumferentially about said channel and aligned with openings in said channel;
movable mounting elements mounted on said jaw for motion toward or away from a tree trunk positioned therein, said rollers being rotatably carried about their central axes by said mounting elements for peripheral engagement with a tree trunk positioned within said jaw;
first power means on said jaw operatively connected to said mounting elements adapted to selectively position said rollers through said openings outward of the channel or within the channel in engagement with a tree trunk;
second power means connected to said rollers adapted to rotate said rollers in unison about their supporting axes on said mounting elements;
third power means comprising a double acting hydraulic cylinder assembly pivotally connected between said movable frame means and a crank arm fixed relative to said jaw and protruding radially outward from the pivotal axis of said jaw on said movable frame means, said cylinder assembly being adapted to selectively move the jaw about said axis of said jaw on said movable frame means between a substantially upright longitudinal position and a substantially horizontal longitudinal position;
fourth power means comprising a double acting hydraulic cylinder assembly pivotally connected to said vehicle frame and said supporting element of said frame means;
and fifth power means comprising a double acting hydraulic cylinder assembly pivotally connected between said supporting element and said pedestal assembly at a location radially offset from the pivotal axis of said pedestal assembly on said supporting element.

References Cited in the file of this patent

UNITED STATES PATENTS

| | | |
|---|---|---|
| 840,314 | Gray et al. | Jan. 1, 1907 |
| 2,477,922 | Emery et al. | Aug. 2, 1949 |
| 2,482,392 | Whitaker | Sept. 20, 1949 |
| 2,583,971 | Shuff | Jan. 29, 1952 |
| 2,843,165 | Sherron | July 15, 1958 |
| 2,876,816 | Busch et al. | Mar. 10, 1959 |
| 2,882,941 | Pope | Apr. 21, 1959 |